United States Patent
Derry et al.

(10) Patent No.: US 7,079,153 B2
(45) Date of Patent: Jul. 18, 2006

(54) SYSTEM AND METHOD FOR CREATING MARK-MAKING TOOLS

(75) Inventors: John Edward Derry, Overland Park, KS (US); Shawn Lipstein, Ottawa (CA); Maksim Kuzmin, Ottawa (CA); Tanya Staples, Kanata (CA)

(73) Assignee: Corel Corporation (CA)

( * ) Notice: Subject to any disclaimer, the term of this patent is extended or adjusted under 35 U.S.C. 154(b) by 285 days.

(21) Appl. No.: 10/407,963

(22) Filed: Apr. 4, 2003

(65) Prior Publication Data

US 2004/0196295 A1    Oct. 7, 2004

(51) Int. Cl.
G09G 5/00 (2006.01)
G09G 5/02 (2006.01)
G06F 9/00 (2006.01)

(52) U.S. Cl. .................. 345/594; 345/156; 715/700; 715/810; 715/825

(58) Field of Classification Search ........... 345/418, 345/581, 619, 643, 650, 652, 661, 700, 771, 345/781, 810–811, 813, 831, 833, 843, 845, 345/848, 179–182, 594, 964–966, 156, 173; 382/168–173, 176, 184, 188–189; 715/813, 715/831, 833, 843, 845, 848, 810–811, 700, 715/781, 825–826
See application file for complete search history.

(56) References Cited

U.S. PATENT DOCUMENTS

| | | | |
|---|---|---|---|
| 5,767,860 A * | 6/1998 | Zimmer et al. | 345/441 |
| 5,835,086 A | 11/1998 | Bradstreet et al. | 345/326 |
| 5,999,190 A | 12/1999 | Sheasby et al. | 345/431 |
| 6,097,392 A | 8/2000 | Leyerle | 345/358 |
| 6,201,549 B1 | 3/2001 | Bronskill | 345/441 |
| 6,310,622 B1 | 10/2001 | Asente | 345/441 |
| 6,329,990 B1 | 12/2001 | Silverbrook et al. | 345/431 |
| 6,351,269 B1 | 2/2002 | Georgiev | 345/629 |
| 6,373,490 B1 * | 4/2002 | Bendiksen et al. | 345/441 |
| 2002/0085003 A1 * | 7/2002 | Nagashima | 345/441 |
| 2003/0098872 A1 * | 5/2003 | Georgiev | 345/647 |
| 2003/0107558 A1 * | 6/2003 | Bryborn et al. | 345/179 |
| 2004/0056859 A1 * | 3/2004 | Ohba et al. | 345/426 |

OTHER PUBLICATIONS

*Adobe Photoshop 5.0 User Guide*, 1998, pp. 129-130.
*Kai's Power Tools 3 Explorer Guide*, 1995, pp. 77-86.

* cited by examiner

Primary Examiner—Richard Hjerpe
Assistant Examiner—Wesner Sajous
(74) Attorney, Agent, or Firm—Hayes Soloway P.C.

(57) ABSTRACT

A mark-making tool creator creates mark-making tool definitions for a graphic computer software application having a mark-making tool handler for handling mark-making tools based on mark-making tool definitions. The mark-making tool creator comprises a donor handler for receiving definitions of selected donor mark-making tools and a control value synthesizer. Each definition has a set of donor control values defining the respective donor mark-making tool. The control value synthesizer interpolates the sets of donor control values of the selected donor mark-making tools to generate one or more new sets of control values, and provides the new sets of control values to the mark-making tool handler as new definitions to create and display new mark-making tools for user's preview.

33 Claims, 7 Drawing Sheets

| Brush Definition A | |
|---|---|
| Value 1: | 10% |
| Value 2: | 2% |
| Value 3: | 30% |
| Value 4: | 1% |
| Value 5: | 10% |
| Value 6: | ABCD |
| Value 7: | ABCD |
| Value 8: | ABCD |
| Value 9: | ABCD |
| Value 10: | 80% |
| Value 11: | 50% |
| Value 12: | 5% |

SYSTEM AND METHOD FOR CREATING MARK-MAKING TOOLS

This invention relates to graphic computer software systems and more particularly, to a system and method for creating mark-making tools for graphic computer software applications.

BACKGROUND OF THE INVENTION

Graphic software applications provide users with mark-making tools for drawing marks on a digital canvas. Many mark-making tools simulate the look of traditional artistic media, such as chalks, brushes and ink. A traditional graphic software application uses an internal mark-making tool engine to provide predefined mark-making tools which provide marks of predefined fixed appearances. The number of those predefined mark-making tools that an application can provide is limited and some sophisticated users want to use more different mark-making tools.

In order to respond to the demand of those sophisticated users, some graphic software applications use more sophisticated pixel pipeline mark-making tools that have numerous adjustments or parameters for dynamically altering the appearance of marks made on the digital canvas. A typical example of this type of tools is a pressure-sensitive pen and tablet. The characteristics of a mark-making tool are dynamically altered as the tool is applied by the user. The dynamical alteration of the appearance is suitable for some marking, but it is still restricted to the dynamical alteration of existing mark-making tools and does not provide new mark-making tools.

Some graphic applications allow mutation of existing mark-making tools to create new mark-making tools. Mutation is variation of characteristics of an existing mark-making tool. Most existing mutation techniques rely on a randomized computation. The mutations of an existing mark-making tool are randomly chosen and displayed for the user to utilize. These randomized computations of mutations typically have the ability to control the severity of the randomized selections. For example, some graphic application use Kai's Power Tools (KPT) filters that use a genetic mutation approach. This approach allows the user to see a set of random variations surrounding the current selection. Clicking on a variation moves it to the current selection and updates the surrounding random variations to a new set. A strength adjuster is used to adjust how radical the variations are. The higher the setting, the more extra the variations. While this randomized mutation techniques allow creation of new mark-making tools by selecting from given random variations, they do not allow for the ability to control the direction of the randomization. The surrounding variations are always random regardless which variation is the current selection. While these randomized computation techniques allow for a random mutation of any given mark-making tool, they do not allow for specific control over the way it will mutate or control over the type of traits the new mark-making tool will take on. Such control would be valuable when attempting to create a specific type of mark-making tool.

In order to express a broad range of various marks, another solution used in an existing sophisticated graphic application is to use a large set of adjustable controls to allow users to adjust settings of controls to create new mark-making tools. Because of the complex interaction of all of these controls, typically a long learning curve is required for the users to become proficient in the creation of new or modified mark-making tools.

The primary technique to shield the users from this long learning curve has been to provide the users with "presets". A preset is an encapsulation of all unique control settings of a mark-making tool that combine to produce a specific mark-making result. Some sophisticated graphic applications supply hundreds of these presets. The user can simply select an existing preset to reconfigure the control array of the mark-making tool engine of the application to behave according to the preset. Presets often use naming conventions that associate them with traditional expressive mark-making tools, such as Oil Brush, Soft Charcoal, and 2B Pencil.

These presets often initially satisfy the mark-making demands of the user. However, at some point, many users will want to create their own mark-making tools. It is therefore desirable to provide a system that allows users to easily create new mark-making tools without requiring extensive learning exercises.

SUMMARY OF THE INVENTION

It is an object of the invention to provide a novel system and method for creating mark-making tools that obviates or mitigates at least one of the disadvantages of existing systems.

The invention uses a mutation by transposing technique which allows a user to create a new mark-making tool based on a set of existing mark-making tools.

In accordance with an aspect of the present invention, there is provided a mark-making tool managing system for managing mark-making tools for a graphic computer software application. The mark-making tool managing system comprises a mark-making tool handler, a mark-making tool creator and a user interface. The mark-making tool handler has adjustable controls, each mark-making tool having a definition including a set of control values based on which the mark-making tool handler controls the mark-making tool. The mark-making tool creator provides one or more sets of control values to the mark-making tool handler to create one or more new mark-making tools. The mark-making tool creator has a donor handler for receiving definitions of selected donor mark-making tools, each definition having a set of donor control values defining the respective donor mark-making tool, and a control value synthesizer for interpolating the sets of donor control values of the selected donor mark-making tools to generate one or more new sets of control values, and providing the new sets of control values to the mark-making tool handler. The user interface is provided for presenting to a user the new mark-making tools and sample marks made by the new mark-making tools.

In accordance with another aspect of the invention there is provided a mark-making tool creator for creating mark-making tool definitions for a graphic computer software application having a mark-making tool handler for handling mark-making tools based on mark-making tool definitions. The mark-making tool creator comprises a donor handler and a control value synthesizer. The donor handler is provided for receiving definitions of selected donor mark-making tools, each definition having a set of donor control values defining the respective donor mark-making tool. The control value synthesizer is provided for interpolating the sets of donor control values of the selected donor mark-making tools to generate one or more new sets of control values, and providing the new sets of control values to the mark-making tool handler as new definitions to create and display new mark-making tools for user's preview.

In accordance with another aspect of the invention, there is provided a mark-making tool managing user interface system for a graphic computer software application. The user interface system comprises means for allowing a user to select donor mark-making tools, each donor mark-making tool having a definition including a set of donor control values defining the donor mark-making tool, means for displaying sample marks made by new mark-making tools which are created based on the donor mark-making tools by interpolating the sets of donor control values and generating one or more sets of new control values for the new mark-making tools, and means for allowing the user to use one of the new mark-making tools.

In accordance with another aspect of the invention, there is provided a method for creating mark-making tools for a graphic computer software application. The method comprises steps of receiving definitions of selected donor mark-making tools, each definition having a set of donor control values defining the respective donor mark-making tool, interpolating the sets of donor control values of the selected donor mark-making tools to generate one or more new sets of control values, and creating new mark-making tools based on the new sets of control values.

In accordance with another aspect of the invention, there is provided a computer readable medium storing the instructions and/or statements for use in the execution in a computer of a, method for creating mark-making tool definitions for a graphic computer software application. The method comprises steps of receiving definitions of selected donor mark-making tools, each definition having a set of donor control values defining the respective donor mark-making tool, interpolating the sets of donor control values of the selected donor mark-making tools to generate one or more new sets of control values, and creating new mark-making tools based on the new sets of control values.

In accordance with another aspect of the invention, there is provided electronic signals for use in the execution in a computer of a method for creating mark-making tool definitions for a graphic computer software application. The method comprises steps of receiving definitions of selected donor mark-making tools, each definition having a set of donor control values defining the respective donor mark-making tool, interpolating the sets of donor control values of the selected donor mark-making tools to generate one or more new sets of control values, and creating new mark-making tools based on the new sets of control values.

In accordance with another aspect of the invention, there is provided a computer program product for use in the execution in a computer of a method for creating mark-making tool definitions for a graphic computer software application. The computer program product comprises a module for receiving definitions of selected donor mark-making tools, each definition having a set of donor control values defining the respective donor mark-making tool, a module for interpolating the sets of donor control values of the selected donor mark-making tools to generate one or more new sets of control values, and a module for creating new mark-making tools based on the new sets of control values.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

According to an embodiment of the invention, the creation of new mark-making tools is carried out using a mutation by transposing technique. The mutation by transposing technique deals with synthesizing variations of existing mark-making tools. It interpolates control data sets of existing mark-making tools and creates a new mark-making tool having a mixture of characteristics of the existing mark-making tools.

Figures 1, 4:
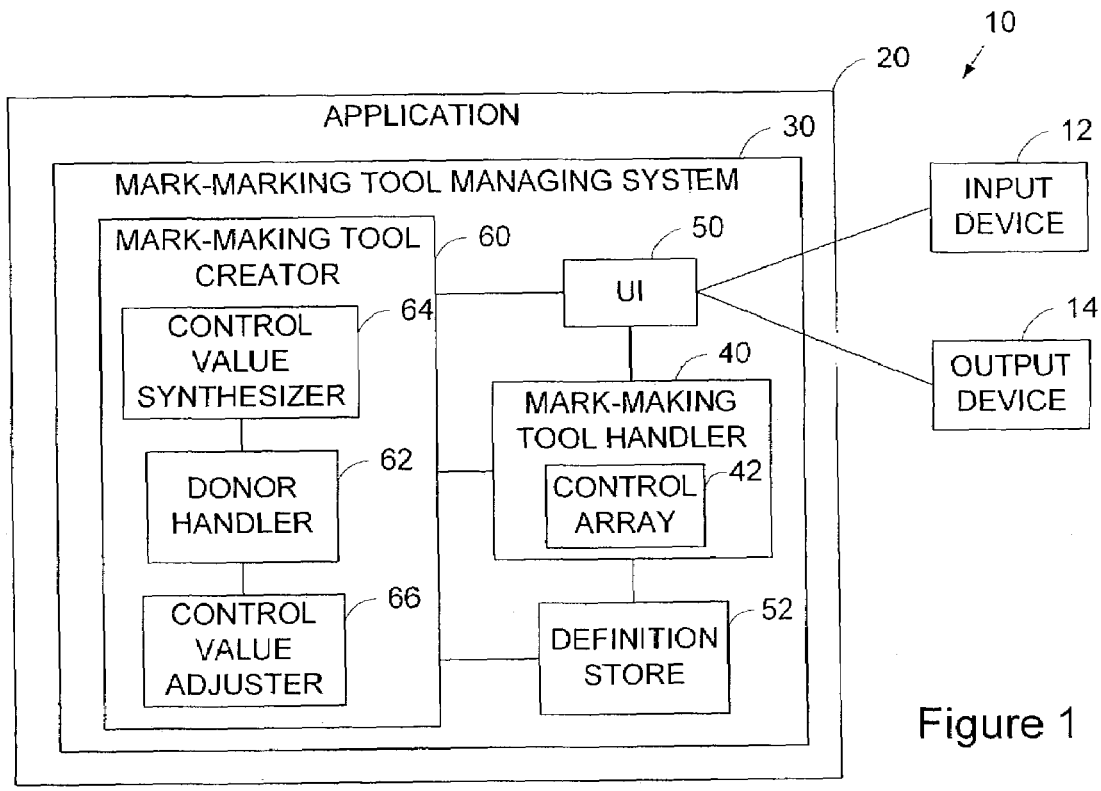
FIG. 1 is a block diagram showing a mark-making tool managing system in accordance with an embodiment of the invention.
FIG. 4 is a diagram showing an example of a definition of a mark-making tool.

Referring to FIG. 1, a mark-making tool managing system in accordance with an embodiment of the present invention is described. The mark-making tool managing system 30 is provided for a graphic software application 20 running on a computer system 10. The computer system 10 uses one or more input devices 12 for receiving instructions from users, and one or more output devices 14 including a monitor for displaying available mark-making tools and marks made by mark-making tools on electronic canvas.

The mark-making tool managing system 30 has a mark-making tool handler 40, a user interface 50 and a definition store 52. In FIG. 1, user interface 50 and definition store 52 are shown as a part of the mark-making tool managing system 30. However, they may be provided outside the mark-making tool managing system 30 and shared with other functions of the application 20 or other applications.

The mark-making tool handler 40 handles behaviour of preset mark-making tools and any newly created mark-making tools. The mark-making tool handler 40 has an array of adjustable controls 42. Data or values of the controls 42 determine how the mark-making tool handler 40 controls a currently selected mark-making tool and define the characteristics of marks that the mark-making tool can make on electronic canvas. Examples of controls may include size, spacing, angle and bristle. These controls are also called as parameters.

Each mark-making tool has a set of values of the controls 42. The set of these control values is called a "mark-making tool definition" or a "brush definition".

The set of control values in a mark-making tool definition is preferably organized in the same manner for the mark-making tools provided for the application 20. Only the values associated with each control may vary and the organization format remains the same.

The application 20 typically provides a number of presets of mark-making tools. Each preset is encapsulated in a prescribed tool definition having a list of variable control values, and stored in a file of a predefined format.

In order to allow reuse of mark-making tools, the mark-making tool definitions are stored in a prescribed file format that can be recalled and used to reset all relevant controls to its unique set of values. For this purpose, the mark-making tool handler 40 may have a definition store 52 or use a storage in the computer system 10 for storing the mark-making tool definitions., Those mark-making tools are presented to the users through the user interface 22 and displayed on the output device 14. The user can select a desired mark-making tool and manipulate it to make marks on the electronic canvas through the input device 12. The user's input is received by the user interface 22, and the mark-making tool handler 40 causes the selected mark-making tool to behave according to the user's input and the control values of the selected mark-making tool.

A user interface 50 in the work space of the application 20 contains a user interface for retrieving and loading a definition of a mark-making tool. Each time a definition file is recalled from a list of the presets, the particular settings of control values stored in the recalled definition file are read in and reset the controls to behave in a unique manner.

It is preferable that the mark-making tool definition file is stored as an individual Extensible Markup Language (XML) file. XML is a universal format for data, and allows software developers to easily describe and deliver rich, structured data from any application in a standard consistent way. Additionally, XML is not platform dependent. This enables the same file to be readable on different platforms with no changes. Thus, XML is preferable for its open standard, as well as its cross-platform compatibility. However, in a different embodiment, other file formats may be used.

The following is an example of a XML format of a mark-making tool:

```
<?xml version="1.0"?>
<!-- Painter 7.0 Brush Definition -->
<painter-brush-definition>
    <format-control-parameters
        version-number="7"
        variant-name="Coarse Hairs">
    </format-control-parameters>
    <brush-type-parameters
        dab-type="CamelHair"
        dab-flags="NewFormat|PenPicture|SaveRestoreMouseParams"
        brush-source="Color"
        stroke-type="Single"
        pen-type="Opacity"
        liquid-ink-type="InkPlusColor"
        behavior-flags="Grain"
        pen-control-flags="">
    </brush-type-parameters>
    <physical-brush-parameters
        radius="20.0"
        min-radius-fraction="0.206"
        radius-log="1.03"
```

-continued

```
        base-angle="24.9"
        delta-angle="0.0"
        min-angle="0.0"
        thinness="1.0"
        spread="0.7"
        feature-size="2.5"
        min-feature-size="1.0"
        profile="Cusp"
        wet-fringe="0.0"
        factor="0.529"
        rand-rad="0.786"
        speckle-scale="5.3"
        scale-size="0.476"
        random-size="0.3"
        bristle-fraction="0.42"
        bristle-random-size="0.7">
    </physical-brush-parameters>
    <dab-application-parameters
        opacity="0.25"
        grain="0.2"
        z-drawing-type="Pen"
        z-drawing-mask="DrawColor"
        depth="0.12"
        smoothing="1.0"
        plow="1.0"
        wet="False"
        post-diffuse="0"
        smoothness="1.42"
        volume="1.2"
        min-volume="1.0"
        random-volume="0.3"
        bristle-random-volume="0.6"
        wetness="38.0"
        pickup="0.0"
        dry-rate="0.03"
        evaporation-threshold="0.53"
        diffusion-amount="0.87"
        capillary-factor="0.0"
        grain-soak-in="0.0"
        diffuse-direction="270.0"
        diffuse-direction-amount="0.0"
        diffuse-accurate="True">
    </dab-application-parameters>
    <stroke-path-parameters
        advance="0.088"
        min-advance="0.8"
        direction="0.0"
        continuous-time-deposition="False"
        flow="400.0"
        min-flow="0.0"
        jitter="0.0"
        damping="0.5"
        ncubicintermediates="0"
        jitter-strokes="False"
        njitter="10"
        pressure-radius="False"
        contact-angle="0.0"
        bristle-scale="0.0"
        turn="0.0">
    </stroke-path-parameters>
    <color-parameters
        color-variability-type="HSV"
        h-jitter="0.0"
        s-jitter="0.0"
        v-jitter="0.0"
        foreground-color="(159,222,72)"
        background-color="(191,239,208)">
    </color-parameters>
    <cloning-parameters
        clone-sample="False"
        clone-jitter-amount="0"
        clone-jitter-time-threshold="0"
        clone-type="NoOffsetClone0"
        clone-flags="">
    </cloning-parameters>
    <well-parameters
        resat="1.0"
        bleed="0.0"
        resat-taper-dist="0.0"
```

-continued

```
        tapering-resat="False">
    </well-parameters>
    <realtime-expression-parameters
        radius-animator="Pressure"
        angle-animator="None"
        feature-size-animator="None"
        flow-animator="None"
        jitter-animator="None"
        opacity-animator="Pressure"
        grain-animator="None"
        graduation-animator="None"
        bleed-animator="None"
        resat-animator="None"
        depth-animator="None"
        rank1-animator="None"
        rank2-animator="None"
        rank3-animator="None"
        volume-animator="None"
        mouse-pressure="1.0"
        mouse-tilt="0.0"
        mouse-bearing="0.0"
        mouse-wheel="1.0">
    </realtime-expression-parameters>
    <plugin-parameters
        pf-identifier=""
        pf-res-type=" "
        pf-private-
data="00000000000000000000000000000000000000000000000000
000000000000000000000000000000000"
        identifier=""
        res-type=" "
        private-
data="00000000000000000000000000000000000000000000000000
000000000000000000000000000000000">
    </plugin-parameters>
    <interface-customization-parameters
        brush-control-flags=""
        brush-control-flags2="">
    </interface-customization-parameters>
</painter-brush-definition>
```

The internal code in the mark-making tool handler 40 controls the behaviour of a mark-making tool based on these control values in control array 42. A part of the internal code in the mark-making tool handler 40 may control the characteristics of a mark-making tool dynamically as applied by the user, typically with a pressure-sensitive pen and tablet.

The mark-making tool managing system 30 has a mark-making tool creator 60 to allow users to create and exchange their own mark-making tools. In order to synthesize a wide variety of mark-making tools, the tool creator 60 may have a control value adjuster 66. The control value adjuster 66 provides, through the user interface 50, the user with variable controls that adjust the output of the mark-making tool handler 40. These controls are preferably organized in a mark-making tool creation window in a user interface display. Each adjustable control of a preset definition within the file has a corresponding adjustment user interface 50 within the application. The adjustment user interface may be a slider, radio button, pop-up menu or any other form. The user utilizes these controls to modify the corresponding values in the definition file of the mark-making tool. This editing process enables the user to alter the definition files of the preset mark-making tools to their individual preferences.

Figure 2:
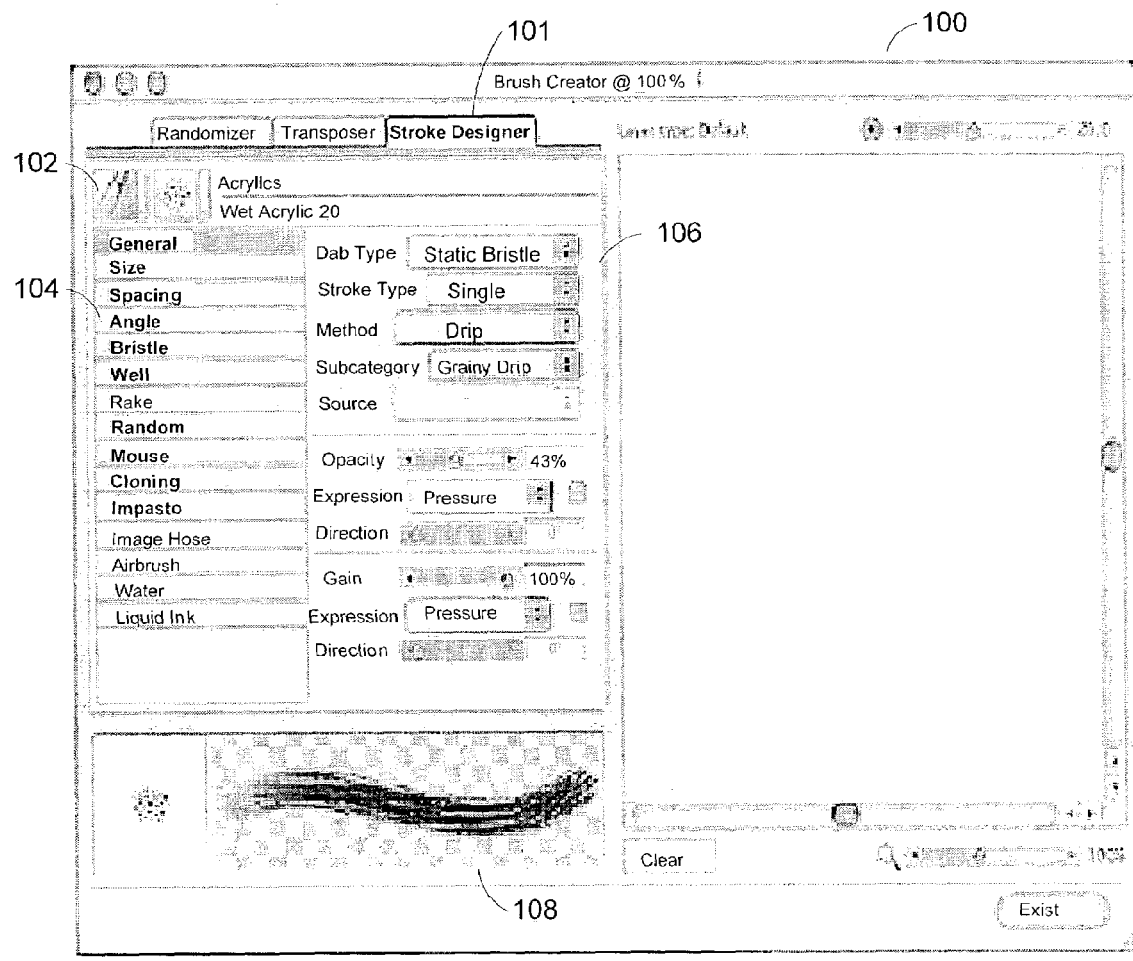
FIG. 2 is a screen shot showing an example of a user interface display for creating a mark-making tool.

FIG. 2 shows an example of a mark-making tool designing window 100 that organizes the variable controls 104 of a selected mark-making tool 102. In this example, the window 100 is organized into individual panels 106, each containing a grouped cluster of functionally related controls 104. As the value range of a control is adjusted, its visual appearance is previewed as a sample stroke 108 displayed beneath the controls 104. It is the unique configuration of all of these control values that configure the mark-making tool handler 40 to produce a specific visual appearance and behaviour of the selected mark-making tool. By adjusting each control value, the user can create a new mark-making tool.

In a sophisticated graphic software application, there are often over 100 adjustable control values that form the unique expression of an individual mark-making tool. For many users, creating a new mark-making tool of intended characteristics by setting all necessary control values is often too complicated and not intuitive. A user has to experiment with the wide variety of controls to determine the correct settings of control values for an intended mark-making tool.

In order to ease the creation of new mark-making tools, the mark-making tool managing system 30 provides a mark-making tool designer 60.

The mark-making tool designer 60 uses the mutation by transposing technique that allows a user to use a set of existing mark-making tools to create one or more new mark-making tools.

The mark-making tool designer 60 controls settings of values in control array 42 in the mark-making tool handler 40 to create new mark-making tools or modify existing mark-making tools. The mark-making tool designer 60 has a donor handler 62 and a control value synthesizer 64.

The donor handler 62 handles definitions of two or more mark-making tools, which act as donors for mutation. Each definition includes a set of control values, which is called "donor control values" hereinafter. The donor handler 62 may selects initial donor mark-making tools based on user's input, default settings or randomly. The following descriptions mainly describe embodiments where two mark-making tools are selected as donors, but more mark-making tools may be used as donors.

The control value synthesizer 64 carries out the transposing by mutation technique. It transposes one set of donor control values with the other, or interpolates the sets of donor control values to generate one or more new sets of control values. For each control, two donor mark-making tools provide a higher value and a lower value. The newly generated control value for each control falls within a range between the higher value and the lower value. When the values of both donor mark-making tools are the same for a particular control, the new value generated is also the same value for the particular control. Based on the new sets of control values, the mark-making tool handler 40 creates new mark-making tools.

Figure 3:
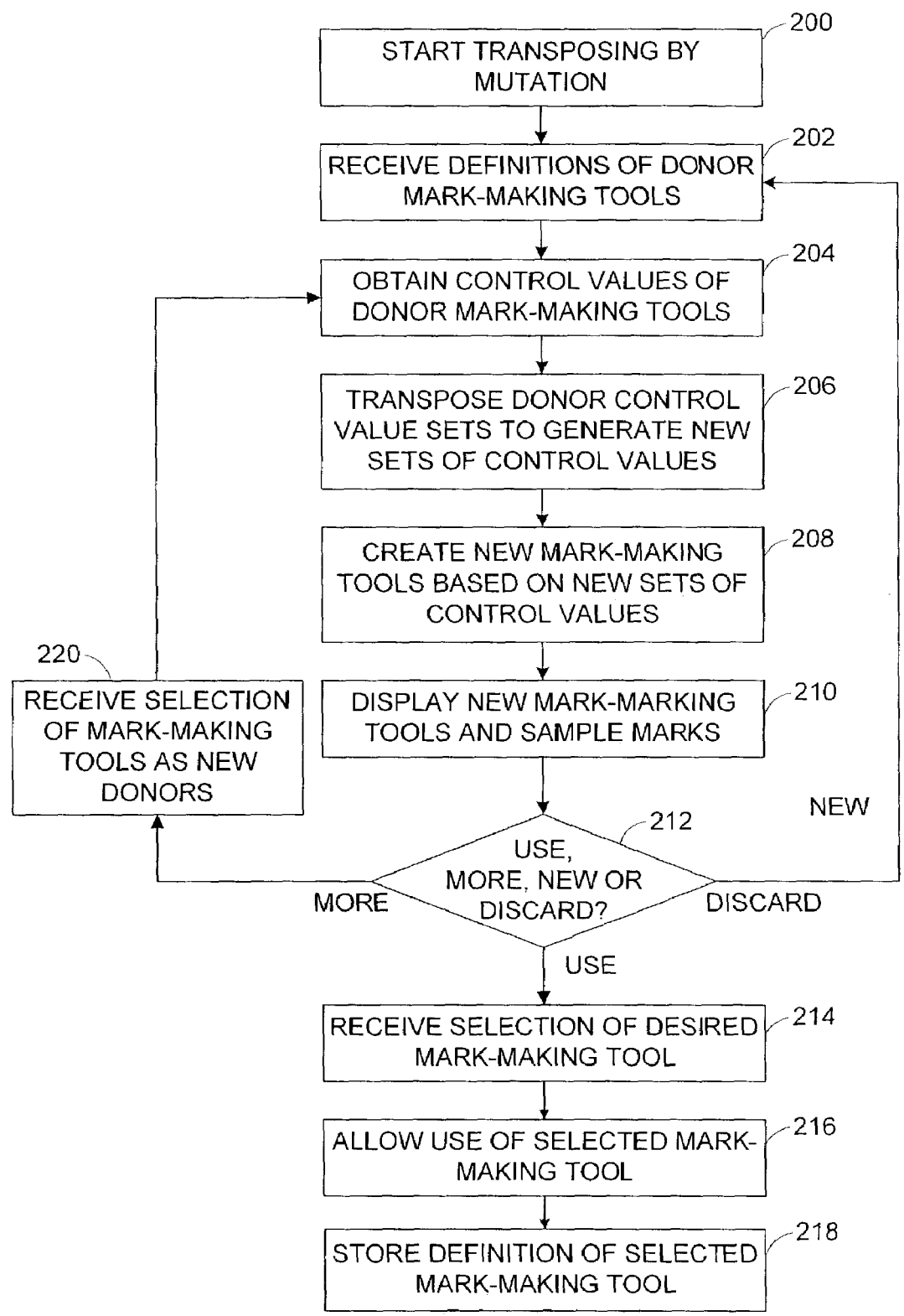
FIG. 3 is a flow chart showing a method of creating new mark-making tools.

The operation of the mark-making tool managing system 30 is described referring to FIG. 3. The transposing by mutation is started (200) by activating the mark-making tool creator 60. The user may selects in a user interface window of the mark-making tool handler 40 to start creation of a new mark-making tool.

The donor handler 62 receives definitions of donor mark-making tools (202), each having a set of donor control values. The donor handler 62 may determine the donor mark-making tools based on user's selection, using default settings or randomly. The donor handler 62 obtains the set of donor control values of each donor mark-making tool (204). The set of donor control values are typically retrieved from the definition store 52.

The control value synthesizer 64 interpolates the obtained sets of donor control values to generate one or more new sets of control values (206). The number of new sets may be preset by the user or by the system default. Each new control value is an intermediate value of corresponding donor control values.

The generated new sets of control values are provided to the mark-making tool handler 40, which creates new mark-making tools based on the new sets of control values (208). The mark-making tool handler 40 displays sample marks made by the new mark-making tools (210). When multiple new mark-making tools are created, the sample marks are arranged such that the sample marks can demonstrate gradual changes from one donor to another donor. Thus, the user can visually and intuitively comprehend the direction of the mutation.

The user can determine if he/she wants to use one of the new mark-making tools, increase the intensity of the mutation, or discard the new mark-making tools (212). If the user wants to use one, the user selects a desired mark-making tool (214) and the mark-making tool handler 40 allows the user to use the selected mark-making tool (216) by e.g., changing the mouse cursor to the selected mark-making tool. The mark-making tool handler 40 may store the new set of control values of the selected mark-making tool in the definition store 52 (218). The storing of the new set may be carried out automatically or in response to the user's instructions.

When the user wants to increase the intensity of mutation (212), the user selects, as new donor mark-making tools, two new mark-making tools which are close to the user's desired tool (220). The process goes back to step 204 for the new donor mark-making tools. In this manner, the user can mutate mark-making tools by selectively choosing their visual representation as a donor.

When the user selects to discard the new mark-making tools (212), the process may end or go back to step 202 for starting with different donor mark-making tools, depending on the settings of the system or user's selection.

For example, when the number of donor mark-making tools to be used is set two, the user selects two existing mark-making tools A and B (202) and their definition XML file A and XML file B containing sets of donor control values are retrieved (204). The control value synthesizer 64 transposes control values in files A and B (206). Each file has a prescribed list of settings of variable control values. Each data entry in the list of control values in the file A is interpolated with its corresponding entry in the list of control values in the file B, producing a new set of control values. The control value synthesizer 64 may generate multiple new sets of control values. Based on the generated new sets of control values, a set of intermediate proposed potential new mark-making tools whose characteristics are a transitional blend of the initial donor control values of donor mark-making tools.

The set of proposed new mark-making tools is pre-visualized. The set is displayed so that there is a visual progressive change from a file A-dominated mark-making tool to a file B-dominated mark-making tool (210). This visually observed transition enables the user to make a specific directional choice towards a final desired new mark-making tool. That is, once a pair of donor mark-making tools have been transposed, one of the newly created intermediate mark-making tools can become one of the donors in the next iteration of transposing. The user can select from the proposed set new donor mark-making tools which are closer to the desired new mark-making tool (220), and have the mutation process repeated on the new donor mark-making tools (204-210). Each time the mutation process is repeated based on newly selected donor mark-making tools which are closer to the desired one, the resultant proposed set becomes further closer to the desired mark-making tool.

By selecting one of the proposed mark-making tools (212), the user creates a new mark-making tool that exhibits characteristics of both of the "donor" mark-making tools (216).

Figure 5:
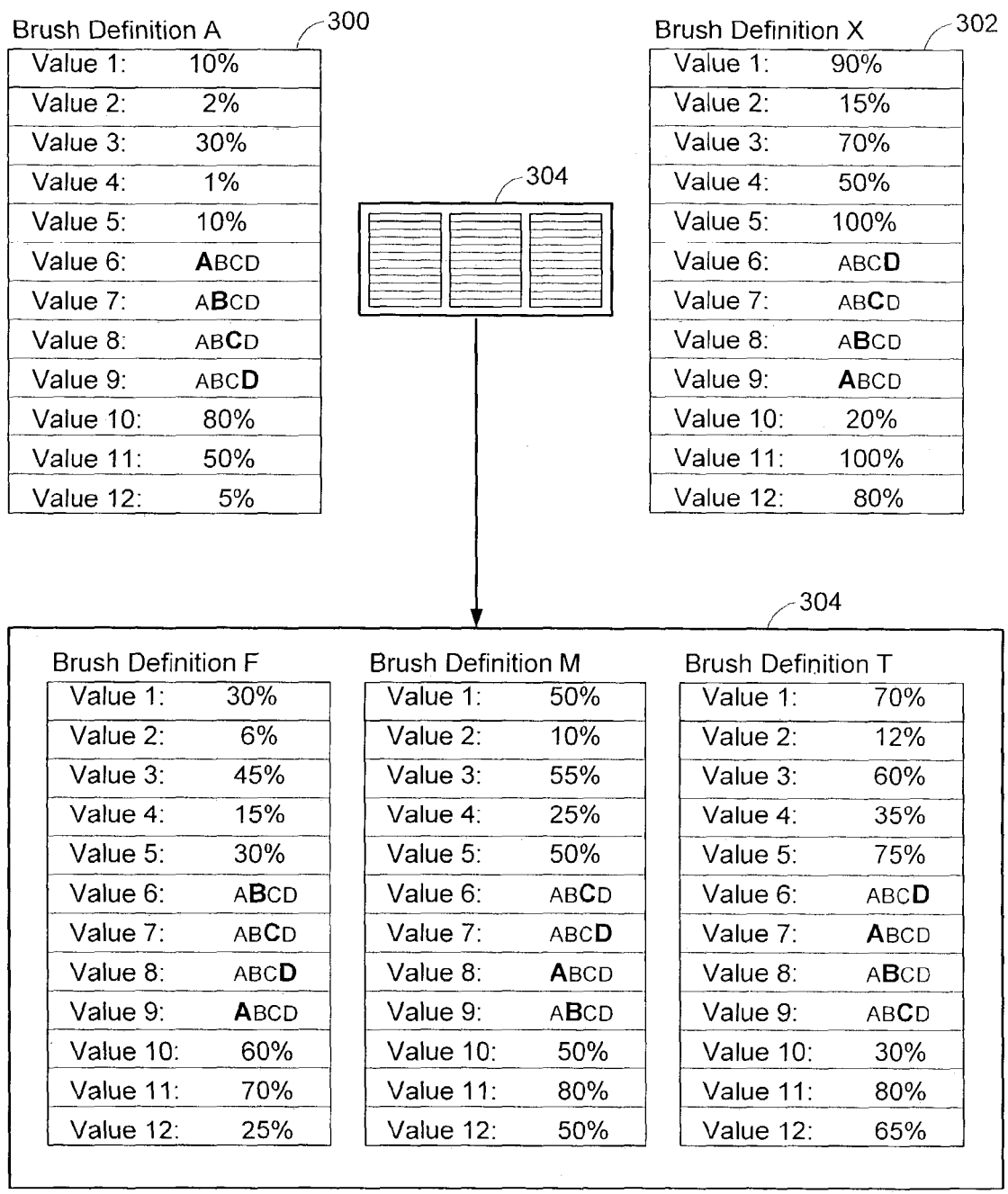
FIG. 5 is a diagram showing an example of creation of new mark-making tools.
Figure 6:
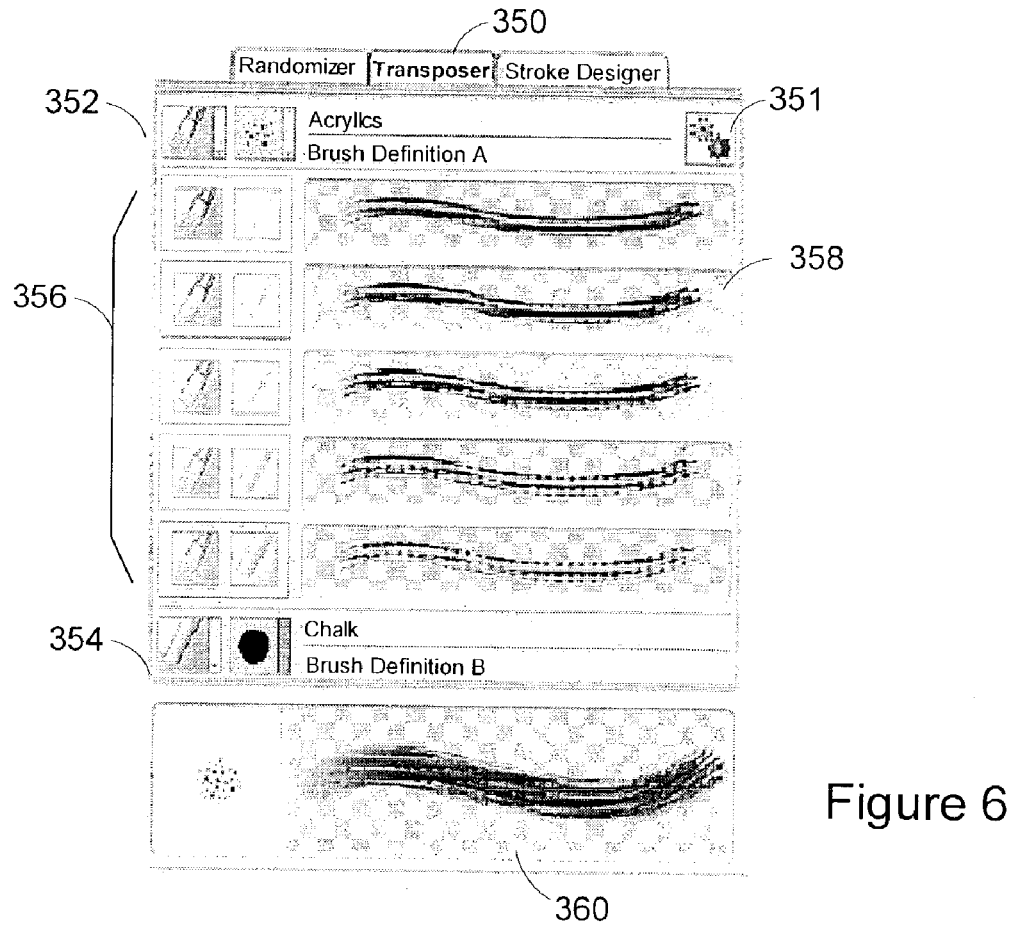
FIG. 6 is a partial screen shot showing an example of a user interface display of sample marks made by new mark-making tools.

An example of creation of a new mark-making tool is illustrated referring to FIGS. 4-6, using, brushes as mark-making tools. FIG. 4 is a simplified graphic representing an example of a brush definition, Brush Definition A. There are 12 control values in this example. This example includes representation exemplifying two types of control data contained in a typical mark-making tool definition: a relative type and absolute type. In FIG. 4, control values 1–5 and 10–12 are relative control values. Control values 6–9 are absolute control values represented with A, B, C and D.

A relative type control value is described as a numeric value that exists within a set range defined by lower and upper limits, or a starting and ending range. The lower and upper limits are determined by the matching pair of donor control values in the two initial donor Brush Definitions A and X. A relative control value may be portrayed in the graphic representation as a percentage within the range of 0–100%.

Aan absolute control value is a specific value that is a member of a limited set of values. An absolute control value is portrayed in Brush Definition A shown in FIG. 4 as an alphabetic character within the range of A–D.

The system 30 may take one donor control value and control its mutation towards another. FIG. 5 is an example illustrating this mutation by transposing. In this example, the mutation by transposing technique is carried out based on two donor Brush Definitions A and X as a starting point. The control values contained in Brush Definition A shown in table 300 are interpolated and mutates taking on some of the properties of Brush Definition X shown in table 302 to synthesize one or more sets of new intermediate control values. The intermediate iterations are shown in table 304. The mutation of a particular control value can be controlled towards another mark-making tool, as shown in table 304 which includes three synthesized intermediate Brush Definitions F, M and T. The result of each new set of intermediate control values is a blending of the characteristics of the two donors. Users can have more control when attempting to revise and fine tune a particular mark-making tool. The number of intermediate iterations to be created may be set by the user.

The computation for mutation is hidden from the user. The user is alternatively presented with a visual interface in a window, such as a display panel 350 for a brush creating user interface shown in FIG. 6. This interface enables selection of two existing mark-making tools, e.g., Acrylics 352 and Chalk 354, as the donors to be transposed. When the user initiates transposition by clicking on a transpose button 351, a set of new intermediate mark-making tools 356 are generated and displayed. Sample marks 358 of the new mark-making tools 356 are also displayed. A selected mark-making tool 360 is also displayed at the bottom of the panel 350.

By presenting the data of new mark-making tools visually, the user can design new mark-making tools in a particular direction without an intimate knowledge of the various controls that constitute a mark-making tool definition and their myriad interrelationships. The process may be entirely visually driven for the users. Thus, a user can experiment and design new mark-making tools without unduly frustration typically incurred when dealing with a complex system.

Figure 7:
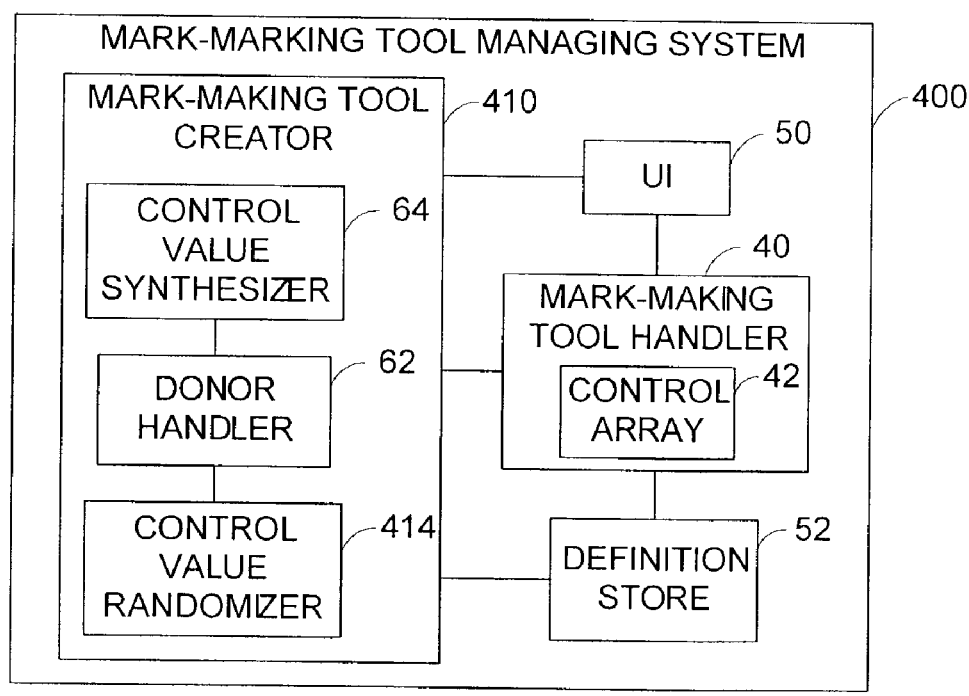
FIG. 7 is a block diagram showing a mark-making tool managing system in accordance with another embodiment of the invention.

Referring now to FIG. 7, a mark-making tool managing system 400 in accordance with another embodiment of the invention. The mark-making tool managing system 400 is similar to the mark-making tool designing system 30 shown in FIG. 1, except that the mark-making tool creator 60 in the system 30 is replaced with a mark-making tool creator 410 in the system 400. The mark-making tool creator 410 has a randomizer 414. A donor handler similar to donor handler 62 of FIG. 1 is also provided. Similar elements are shown using the same reference numerals in FIGS. 1 and 7.

This example provides random transposition of an existing donor mark-making tool. The randomizer 414 randomizes the control values of the donor mark-making tool to produce a range of new variations of mark-making tools. The randomizer 414 provides an intentional explorative technique for control value mutation.

Figure 8:
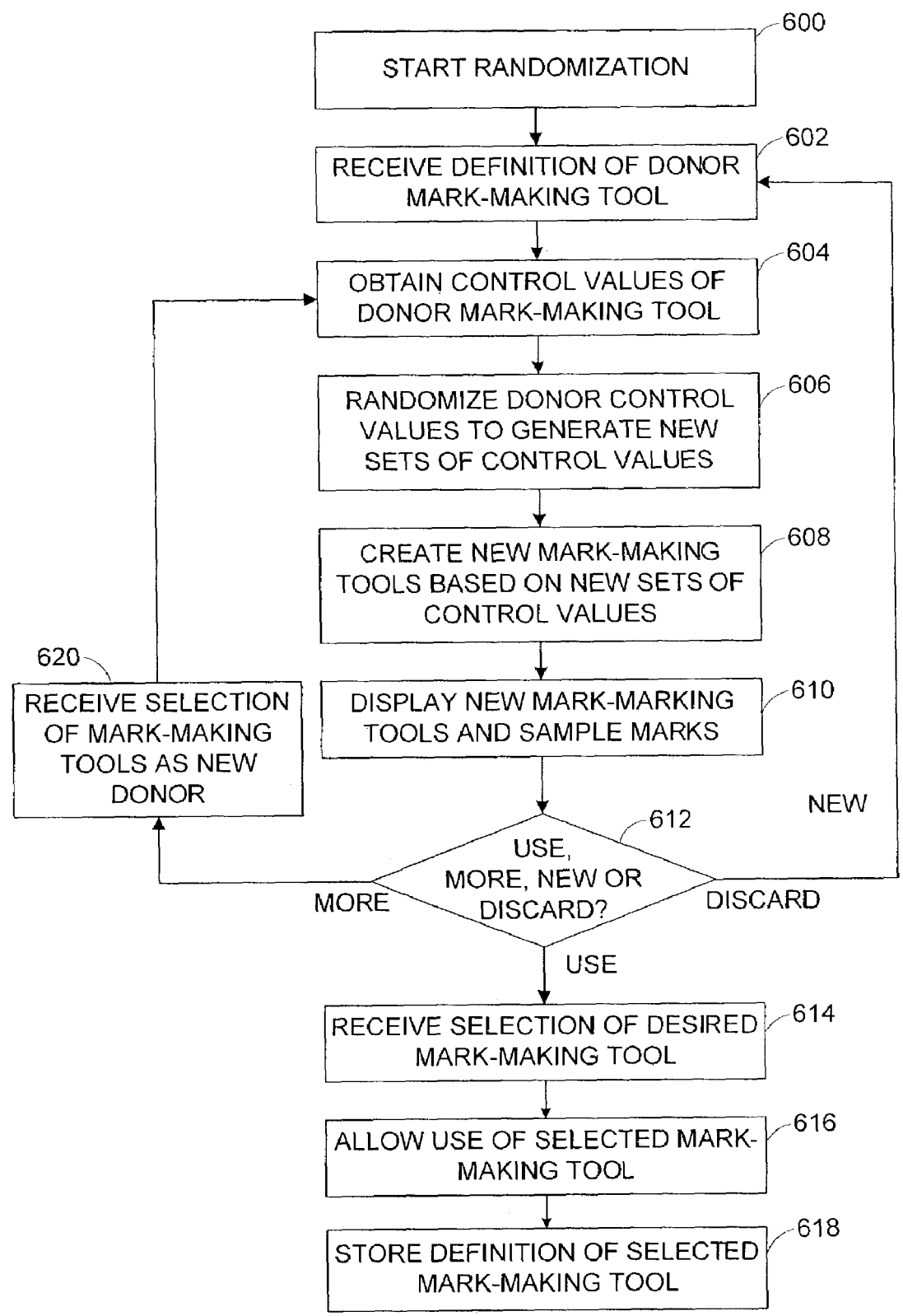
FIG. 8 is a flow chart showing a method of randomization.

FIG. 8 shows an example of the operation of the randomizer 414. The randomizing process starts (600) with a user-selected existing mark-making tool 452 as a donor. The donor handler 62 receive the definition of the donor mark-making tool (602) and retrieves the donor control values (604). The randomizer 414 randomizes the various control values of the donor mark-making tool 452 to generate new sets of control values (606). The new sets of control values are fed to the mark-making tool handler 40 to create new mark-making tools (608). Typically some results will provide useful mark-making tools, other results will not. The determination of usefulness is up to the user.

Figure 9:
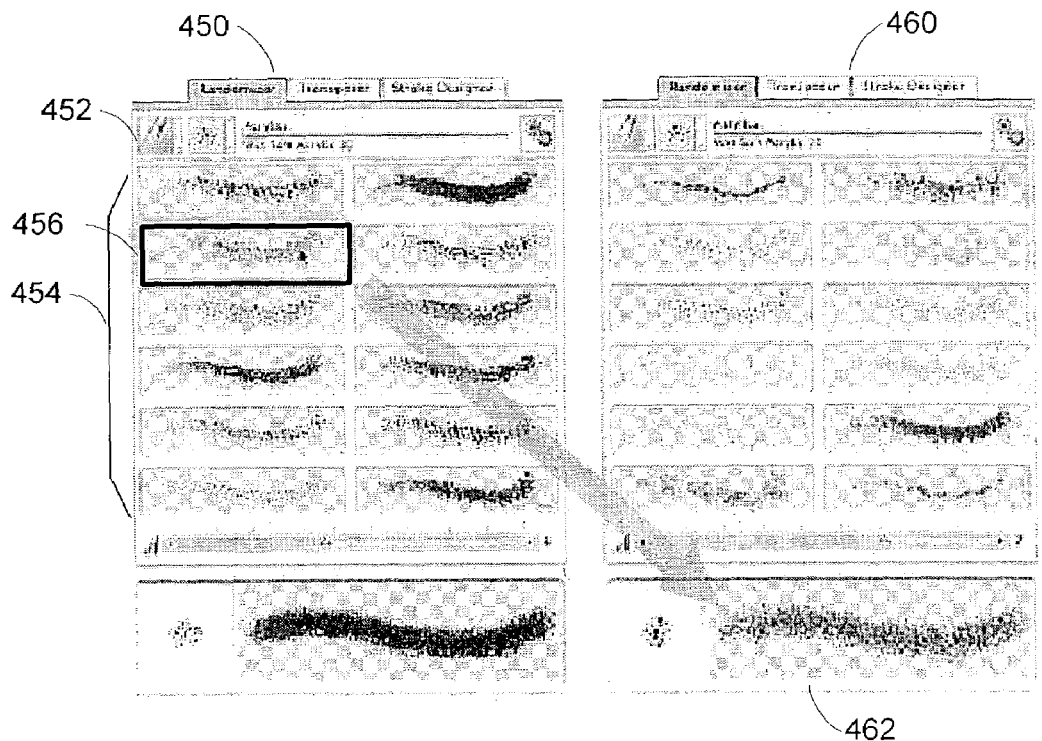
FIG. 9 is partial screen shots showing examples of iterations of randomization.

When a mark-making tool 452 is selected for randomization, an initial set of randomized variations 454 of the mark-making tool 452 is displayed (210) and visually previewed for the user, as exemplified in the randomizer panel 450 shown in FIG. 9. If the user wants more randomized proposed sets (612), any of the new mark-making tools 454 can be selected and subsequently randomized to produce further new mark-making tools (620). When a user selects one 456 of the mark-making tools 454, the randomizer 414 re-randomizes control vales of the newly selected mark-making tool 456 and generate a new re-randomized set shown in the panel 460 (604–610). The ability to repeatedly select and re-randomize randomized mark-making tools provides a technique for visually selecting desired mark-making tool characteristics and the orienting the direction of random change in a particular direction. In other words, desired characteristics are "bred" into a new mark-making tool over the successive generations by randomization.

Additionally, the strength of randomization may be controlled via, e.g., a strength slider in the user interface display. This enables small or large degrees of randomization.

When a desired mark-making tool is selected (614), the mark-making tool handler 40 allows the use of the mark-making tool (616) and may store its definition (218).

Figure 10:
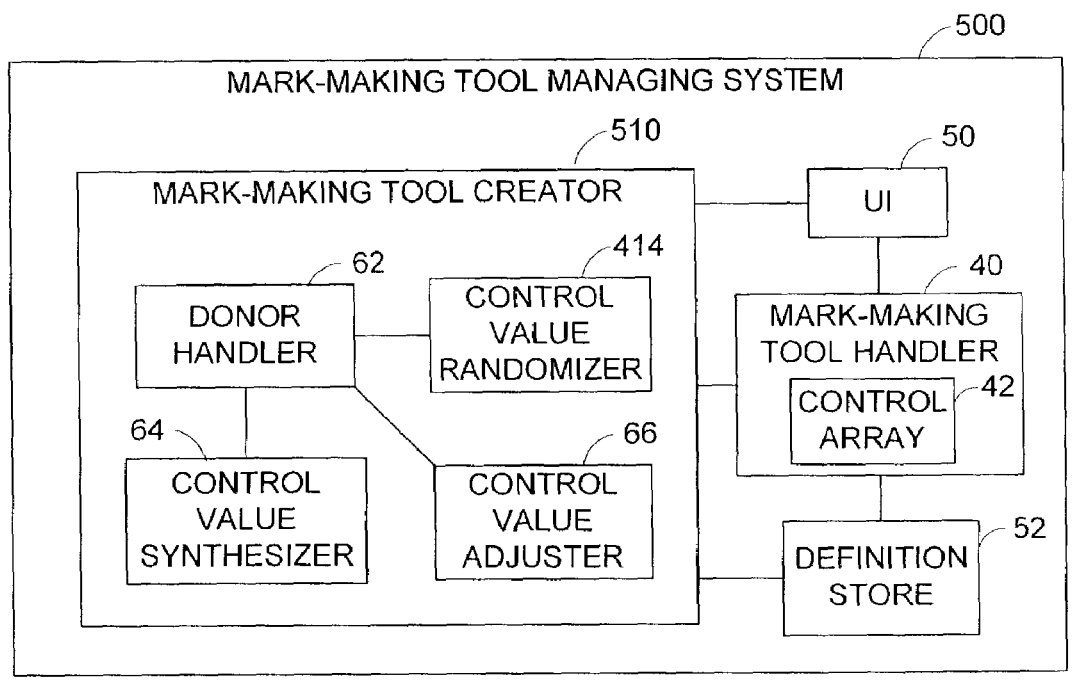
FIG. 10 is a block diagram showing a mark-making tool managing system in accordance with another embodiment of the invention.

FIG. 10 shows another embodiment of a mark-making tool managing system 500 in which a mark-making tool creator 510 has both control value synthesizer 64 and randomizer 414 shown in FIGS. 1 and 7 as well as control value adjuster 66. The user may select to mutate mark-making tools by any of these as desired.

The mark-making tool creator and mark-making tool managing system of the present invention may be implemented by any hardware; software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention. For example, the elements of the mark-making tool creator and the mark-making tool managing system are described separatory, however, two or more elements may be provided as a single element, or one or more elements may be shared with other component in the computer system. In the user interface shown in FIGS. 6 and 8, tabs are used for selecting different types of creating mark-making tools, but other forms for presenting the options may be used. Also, new mark-making tools and their sample marks may be displayed in different arrangements.

What is claimed is:

1. A mark-making tool managing system for managing mark-making tools for a graphic computer software application, the mark-making tool managing system comprising:
    a mark-making tool handler having adjustable controls, each mark-making tool having a definition including a set of control values based on which the mark-making tool handler controls the mark-making tool;
    a mark-making tool creator for providing one or more sets of control values to the mark-making tool handler to create one or more new mark-making tools, the mark-making tool creator having:
        a donor handler for receiving definitions of selected donor mark-making tools, each definition having a set of donor control values defining the respective donor mark-making tool; and
        a control value synthesizer for interpolating the sets of donor control values of the selected donor mark-making tools to generate one or more new sets of control values, and providing the new sets of control values to the mark-making tool handler; and
    a user interface for presenting to a user the new mark-making tools and sample marks made by the new mark-making tools.

2. The mark-making tool managing system as claimed in claim 1 wherein the control value synthesizer limits each new control value to be an intermediate value between upper and lower limits that are determined by the donor control values corresponding to the new control value.

3. The mark-making tool managing system as claimed in claim 1 wherein the donor handler determines the selected donor mark-making tools based on a user input through the user interface.

4. The mark-making tool managing system as claimed in claim 3 wherein the donor handler allows the user to select, as a new donor mark-making tool, a new mark-making tool selected from the new mark-making tools created by the mark-making tool creator.

5. The mark-making tool managing system as claimed in claim 1 wherein the mark-making tool handler allows the user to use a new mark-making tool selected from the new mark-making tools created by the mark-making tool creator.

6. The mark-making tool managing system as claimed in claim 1 further comprising:
    a definition store for storing the definitions of mark-making tools; and
    wherein the donor handler obtains the definitions of the donor mark-making tools from the definition store.

7. The mark-making tool managing system as claimed in claim 1 wherein the mark-making tool creator further comprises a control value adjuster for allowing the user to set individual control values of a mark-making tool.

8. The mark-making tool managing system as claimed in claim 1 wherein the mark-making tool creator further comprises a control value randomizer for randomizing a set of donor control values of a selected donor mark-making tool to provide a set of new mark-making tools that are randomized based on the selected donor mark-making tool.

9. A mark-making tool creator for creating mark-making tool definitions for a graphic computer software application having a mark-making tool handler for handling mark-making tools based on mark-making tool definitions, the mark-making tool creator comprising:
  a donor handler for receiving definitions of selected donor mark-making tools, each definition having a set of donor control values defining the respective donor mark-making tool; and
  a control value synthesizer for interpolating the sets of donor control values of the selected donor mark-making tools to generate one or more new sets of control values, and providing the new sets of control values to the mark-making tool handler as new definitions to create and display new mark-making tools for user's preview.

10. The mark-making tool creator as claimed in claim 9 wherein the control value synthesizer limits each new control value to be an intermediate value between upper and lower limits that are determined by the donor control values corresponding to the new control value.

11. The mark-making tool creator as claimed in claim 9 wherein the donor handler determines the selected donor mark-making tools based on a user input.

12. The mark-making tool creator as claimed in claim 11 wherein the donor handler allows the user to select, as a new donor mark-making tool, a new mark-making tool selected from the new mark-making tools created by the mark-making tool creator.

13. The mark-making tool creator as claimed in claim 9 further comprising:
  a definition store for storing the definitions of mark-making tools; and
  wherein the donor handler obtains the definitions of the donor mark-making tools from the definition store.

14. The mark-making tool creator as claimed in claim 9 wherein the mark-making tool creator further comprises a control value adjuster for allowing the user to set individual control values of a mark-making tool.

15. The mark-making tool creator as claimed in claim 9 wherein the mark-making tool creator further comprises a control value randomizer for randomizing a set of donor control values of a selected donor mark-making tool to provide a set of new mark-making tools that are randomized based on the selected donor mark-making tool.

16. A mark-making tool managing user interface system for a graphic computer software application comprising:
  means for allowing a user to select donor mark-making tools, each donor mark-making tool having a definition including a set of donor control values defining the donor mark-making tool;
  means for displaying sample marks made by new mark-making tools which are created based on the donor mark-making tools by interpolating the sets of donor control values and generating one or more sets of new control values for the new mark-making tools; and
  means for allowing the user to use one of the new mark-making tools.

17. The mark-making tool managing user interface system as claimed in claim 16 wherein each new control value is an intermediate value between upper and lower limits that are determined by the donor control values corresponding to the new control value.

18. The mark-making tool managing user interface system as claimed in claim 16 the means for allowing a user to select donor mark-making tools allows the user to select, as a new donor mark-making tool, a new mark-making tool selected from the new mark-making tools created by the mark-making tool creator.

19. The mark-making tool managing user interface system as claimed in claim 16 further comprising means for allowing the user to set individual control values of a mark-making tool.

20. The mark-making tool managing user interface system as claimed in claim 16 further comprising means for displaying sample marks made by new mark-making tools which are created by randomizing a set of donor control values of a selected donor mark-making tool and generating a set of new mark-making tools for the new mark-making tools.

21. A method for creating mark-making tools for a graphic computer software application, the method comprising steps of:
  receiving definitions of selected donor mark-making tools, each definition having a set of donor control values defining the respective donor mark-making tool;
  interpolating the sets of donor control values of the selected donor mark-making tools to generate one or more new sets of control values; and
  creating new mark-making tools based on the new sets of control values.

22. The method as claimed in claim 21 further comprising a step of displaying the new mark-making tools and sample marks made by the new mark-making tools for user's preview.

23. The method as claimed in claim 21 wherein the application has a mark-making tool handler having adjustable controls, and the creating step comprising steps of:
  providing the new sets of control values to the mark-making tool handler; and
  creating the new mark-making tools by the mark-making tool handler based on the received new sets of control values.

24. The method as claimed in claim 21 wherein the interpolating step limits each new control value to be an intermediate value between upper and lower limits that are determined by the donor control values corresponding to the new control value.

25. The method as claimed in claim 21 further comprising a step of determining the selected donor mark-making tools based on a user input.

26. The method as claimed in claim 25 wherein the determining step allows the user to select, as a new donor mark-making tool, a new mark-making tool selected from the new mark-making tools created by the mark-making tool creator.

27. The method as claimed in claim 21 further comprising a step of allowing the user to select one new mark-making tool from the new mark-making tools created for use.

28. The method as claimed in claim 21 further comprising a step of:
  storing the definitions of mark-making tools in a definition store; and wherein the receiving step receives the definitions of the donor mark-making tools from the definition store.

29. The method as claimed in claim 21 further comprising a step of allowing the user to set individual control values of a mark-making tool.

30. The method as claimed in claim 21 further comprising steps of:
- allowing the user to create a new mark-making tool by interpolation or randomization; and
- randomizing, when the user selects randomization, a set of donor control values of a selected donor mark-making tool to provide a set of new mark-making tools that are randomized based on the selected donor mark-making tool.

31. A computer readable medium storing the instructions and/or statements for use in the execution in a computer of a method for creating mark-making tool definitions for a graphic computer software application, the method comprising steps of:
- receiving definitions of selected donor mark-making tools, each definition having a set of donor control values defining the respective donor mark-making tool;
- interpolating the sets of donor control values of the selected donor mark-making tools to generate one or more new sets of control values; and
- creating new mark-making tools based on the new sets of control values.

32. Electronic signals for use in the execution in a computer of a method for creating mark-making tool definitions for a graphic computer software application, the method comprising steps of:
- receiving definitions of selected donor mark-making tools, each definition having a set of donor control values defining the respective donor mark-making tool;
- interpolating the sets of donor control values of the selected donor mark-making tools to generate one or more new sets of control values; and
- creating new mark-making tools based on the new sets of control values.

33. A computer program product for use in the execution in a computer of a method for creating mark-making tool definitions for a graphic computer software application, the computer program product comprising:
- a module for receiving definitions of selected donor mark-making tools, each definition having a set of donor control values defining the respective donor mark-making tool;
- a module for interpolating the sets of donor control values of the selected donor mark-making tools to generate one or more new sets of control values; and
- a module for creating new mark-making tools based on the new sets of control values.

* * * * *